United States Patent
Loewenthal et al.

(10) Patent No.: US 9,219,710 B2
(45) Date of Patent: Dec. 22, 2015

(54) SEAMLESS AUTHENTICATION WITH PROXY SERVERS

(71) Applicant: Microsoft Corporation, Redmond, WA (US)

(72) Inventors: Eric Loewenthal, Seattle, WA (US); Ivan Pashov, Woodinville, WA (US); Jonathan Silvera, Seattle, WA (US); Matthew Cox, Kirkland, WA (US); Paul Trunley, Bellevue, WA (US); Ziyan Zhou, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/831,847

(22) Filed: Mar. 15, 2013

(65) Prior Publication Data
US 2014/0283001 A1    Sep. 18, 2014

(51) Int. Cl.
| G06F 9/00 | (2006.01) |
| G06F 15/16 | (2006.01) |
| G06F 17/00 | (2006.01) |
| H04L 29/06 | (2006.01) |

(52) U.S. Cl.
CPC ............ *H04L 63/0281* (2013.01); *H04L 63/08* (2013.01)

(58) Field of Classification Search
CPC ............................. H04L 63/0281; H04L 63/08
USPC .......................................................... 726/12
See application file for complete search history.

(56) References Cited

U.S. PATENT DOCUMENTS

| 6,606,663 | B1 | 8/2003 | Liao et al. | |
| 6,671,731 | B1 | 12/2003 | Cain | |
| 7,596,804 | B2 | 9/2009 | Toomey et al. | |
| 2004/0168054 | A1 | 8/2004 | Halasz et al. | |
| 2005/0188210 | A1 | 8/2005 | Perlin et al. | |
| 2006/0095956 | A1* | 5/2006 | Ashley et al. | 726/4 |
| 2012/0144050 | A1* | 6/2012 | Shah | 709/229 |

FOREIGN PATENT DOCUMENTS

EP      1871065 A1    12/2007

OTHER PUBLICATIONS

Laura Pearlman; A Community Authorization Service for Group Collaboration; Year:202; p. 1-10.*

(Continued)

*Primary Examiner* — Monjour Rahim
(74) *Attorney, Agent, or Firm* — Sunah Lee; Sade Fashokun; Micky Minhas

(57) ABSTRACT

A computer can be configured to provide seamless access to a proxy server by, upon connection to a computer network, determining whether a proxy server using authentication is connected to the computer network, and then prompting a user of the computer to enter authentication information for that proxy server. This authentication information for the proxy server then can be stored in a manner accessible by applications on the computer to use the authentication information to connection with requests by the applications to access the second computer network. For example, the operating system can store the authentication information. It also can include a module that processes all requests from applications that access the proxy server, and then includes in such requests the stored authentication information.

35 Claims, 4 Drawing Sheets

(56) References Cited

OTHER PUBLICATIONS

"Using NTLM Proxy Authentication", Retrieved at <<http://www.websense.com/content/support/library/shared/v75/wsga_getting_started/ntlm.aspx>>, Apr. 4, 2011, pp. 2.

"The Shibboleth Proxy", Retrieved at <<http://dev.e-taxonomy.eu/trac/wiki/ShibbolethProxy>>, Jan. 14, 2012, pp. 6.

Ericlaw., "Proxy-Authentication Breaks Many Applications", Retrieved at <<http://blogs.msdn.com/b/ieinternals/archive/2012/08/03/manual-proxy-authentication-requiring-basic-or-digest-breaks-many-applications.aspx>>, Aug. 3, 2012, pp. 4.

Gardenghi, et al., "An Authentication Middleware for Squid Proxy-Cache: a Single Sign-on Approach", Retrieved at <<http://ieeexplore.ieee.org/stamp.jsp?tp=&arnumber=6257625>>, 12th International Conference on Computational Science and Its Applications, 2012, Jun. 18, 2012, pp. 4.

"International Search Report & Written Opinion for PCT Patent Application No. PCT/US2014/026920", Mailed Date: Jul. 23, 2014, Filed Date: Mar. 14, 2014, 9 Pages.

Second Written Opinion for PCT Patent Application No. PCT/US2014/026920, Mailed Date: Feb. 20, 2015.

* cited by examiner

SEAMLESS AUTHENTICATION WITH PROXY SERVERS

BACKGROUND

Many enterprises have private computer networks within which multiple computers are connected. To access a public computer network, such as the internet, from a computer connected to the private computer network of an enterprise, the computer typically connects to a proxy server which manages and monitors network traffic between the enterprise's private computer network and the internet. Access to the internet through the proxy server in some cases uses credentials for authentication to the proxy server.

In most devices with network connectivity, such as through a wireless or Ethernet network connections, the settings for a network interface can include proxy settings, in which a user can enter credentials to authenticate to any proxy server to which they are connected. To make such authentication information available to applications on the device that communicate over the network, such information is manually entered by the user by navigating a user interface that provides access to the settings for the network interface. The user enters and saves the proxy settings. If the user moves the device to another location and connects to a different computer network, and if that network has a proxy server, the user will enter and save different proxy settings.

The proxy server for internet access typically processes request communicated using the HTTP protocol, and often is called and HTTP proxy server. According to convention, if an HTTP request does not include the correct authentication credentials for the HTTP proxy server, an error is returned by the proxy server to the application that issued the HTTP request. This error is called a "407" HTTP status code. Different applications may handle a 407 status code differently, and may simply indicate to a user that there is no connectivity with the computer network they are trying to access.

If a user has not entered authentication information manually through the settings for the network interface, different applications may behave differently when accessing the computer network.

SUMMARY

This Summary is provided to introduce a selection of concepts in a simplified form that are further described below in the Detailed Description. This Summary is intended neither to identify key or essential features of the claimed subject matter, nor to limit the scope of the claimed subject matter.

A computer can be configured to provide seamless access to a proxy server by, upon connection to a computer network, determining whether a proxy server that uses authentication is deployed on the computer network, and then prompting a user of the computer to enter authentication information for that proxy server. In one implementation, the computer first detects the proxy server, then determines whether the proxy uses authentication. This authentication information for the proxy server then can be stored in a manner accessible by applications on the computer to use the authentication information with requests by the applications accessing the second computer network. For example, the operating system can store the authentication information. It also can include a module that processes all requests from applications that access the proxy server, and then includes in such requests the stored authentication information.

By automatically detecting a proxy server, and prompting the user for, and then storing, the authentication information for the proxy server, upon connecting to the network, applications that access the computer network will be ensured to have access to the network.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which the seamless proxy authentication can be implemented.

Figure 1:
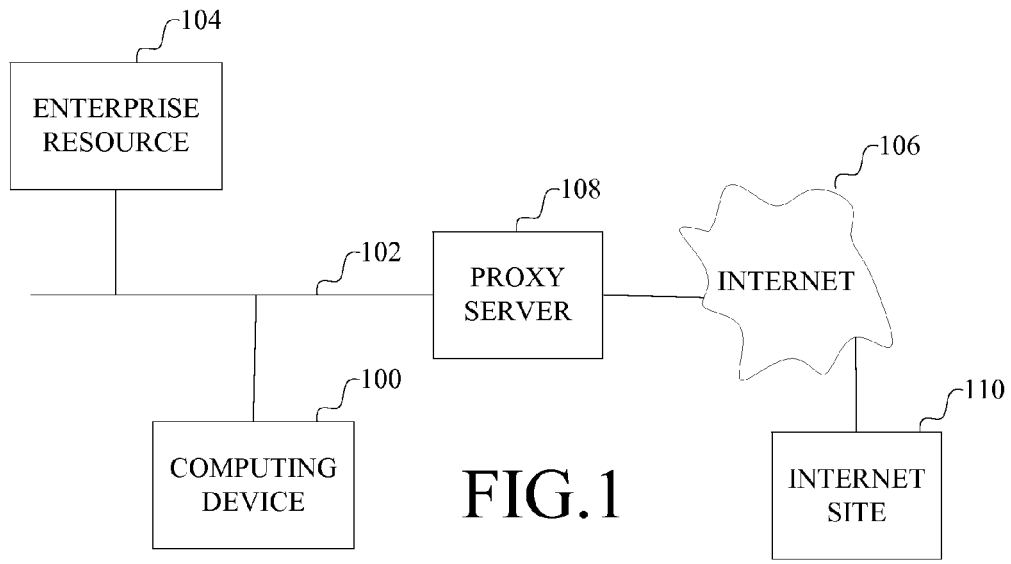
FIG. 1 is a block diagram of an example computer environment in which seamless authentication with a proxy server can be implemented.

Referring to FIG. 1, a computing device 100 connects to a computer network 102. The computing device can be any type of device that has a computer for executing application and a network interface for connecting to a first computer network. An example of such a computing device is described below in connection with FIG. 5. Such a device typically has an operating system that manages access to resources on the device by the applications. Such an operating system may include a network interface module for managing access to the network interface. For example the network interface module may include an HTTP stack for transmitting and receiving messages in the HTTP format over the computer network to which the device is attached.

The first computer network 102 typically is a private computer network, such as within an enterprise, that connects various enterprise computers and other computer related resources as indicated at 104.

To access a computer, such as an internet site 110, on a second computer network 106, such as the internet, from a computer on the first computer network 102, such access is managed through a proxy server 108. The proxy server may be configured to check for authentication credentials or information, such as a username and password. Typically, such authentication information is verified for each request passing through the proxy server.

Upon connection of the computing device 100 to the first computer network 102, the computing device detects whether the proxy server 104 is present and using authentication information. For example, the computing device can automatically identify the proxy server, and then attempt to send a request to a known computer (e.g., internet site 110) on the second computer network through the proxy server. The internet site can be a computer, such as computer supporting a cloud service, which stores information used by applications on the computer, and in some cases used to update display elements of the applications. If an authentication error is received from a proxy server, the computing device prompts a user to enter the authentication information. After verifying that the authentication information is accepted by the proxy server (e.g., by attempting a request to the same computer on the second computer network), then the authentication information is stored in a manner accessible by applications on the computing device for communication with computers on the second computer network.

A more detailed data flow diagram of an example implementation of the computing device 100 will now be described in connection with FIG. 2.

The computing device includes an operating system 200 that manages access to resources on the computing device, such as a network interface, processor and memory, by applications 202 and 204. Applications 202 and 204, for example, can issue requests to access a computer network (not shown), which are processed by the operating system and provided to a network interface for transmission over the computer network. Similarly, the network interface can receive messages over the computer network destined for applications 202 or 204, and provides them to the operating system to be passed on to the applications. A network interface module 206 in the operating system typically manages access to the network interface.

For example, the applications can provide HTTP request messages and receive responses as indicated at 208 and 210. In this case, the network interface module 206 can include an HTTP stack 212 that queues HTTP related communications for the network interface. The network interface module accesses storage for the operating system to store settings 214 for the network interface, including the credentials, i.e., authentication information, for the proxy server.

Upon connection to the network interface to a computer network, the network interface module initiates a process to detect whether there is a proxy server using authentication, and then prompts a user for credentials to be stored in the settings 214 for the network interface. For example, the network interface module can locate the proxy server and then attempt to connect to a known site on the internet through the proxy server by issuing an HTTP request 220. If a 407 status code 222 is received, it is known that the proxy server uses authentication. After the authentication information for the proxy server is received, verified and stored, then the applications 202 and 204 can access computers through the proxy server. For example, using HTTP, applications can issue HTTP requests and the HTTP stack automatically includes the proxy server credentials with the requests sent through the proxy server.

As a result, seamless access through the proxy server is achieved for all applications on that computer. If the computer is moved to another computer network with a different proxy server, the same process configures the authentication information for the different proxy server automatically again upon connection to the other computer network.

Figure 3:
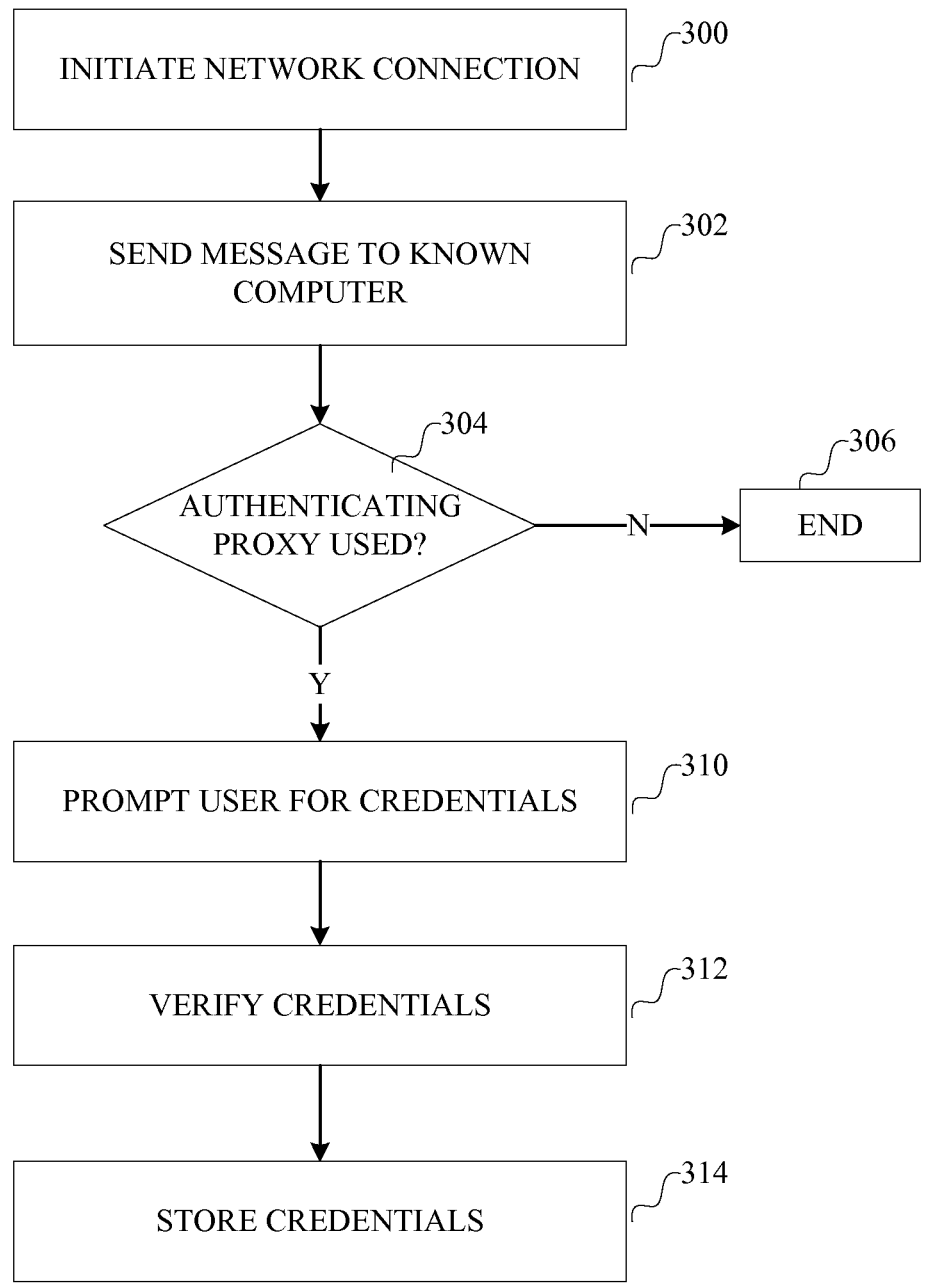
FIG. 3 is flow chart describing how authentication credentials for a proxy server are obtained upon connection to a network.

Referring now to FIG. 3, a flow chart describing an example implementation of the network interface module will now be described. The network interface module initiates 300 a logical connection to a computer network. Such a logical connection typically occurs automatically upon detection of a physical connection with the communication medium for the computer network by the network interface.

After the logical connection has been established, the network interface module then determines whether a proxy server that uses authentication is on the computer network. For example, as shown in FIG. 3, the network interface module can locate any proxy server. In one implementation the proxy server is located using an automatic proxy detection process. In another implementation, the proxy server may be located by manually entered settings. Next, the network interface module sends 302 a message over the computer network and through the proxy server to a known computer on the second computer network, such as a known site on the internet. Based on any reply to that message, the network interface module determines 304 whether the proxy server uses authentication. For example, if a 407 status code is received in response to an HTTP request to the known site, then the proxy server uses authentication. If no proxy server with authentication is detected, then the process ends 306.

Otherwise, if a proxy server with authentication is detected, then the user is prompted 310 to enter the authentication information for the proxy server, for example through any appropriate user interface for the computing device. After the authentication information is received, it can be verified 312. For example, another message can be sent to the internet site used in step 302, using the received authentication information, to determine whether the proxy server accepts the received authentication information. If the authentication information is verified, it can be stored 314 in a manner accessible by other applications on the computer, for example by storing it in the settings for the network interface.

Figure 4:
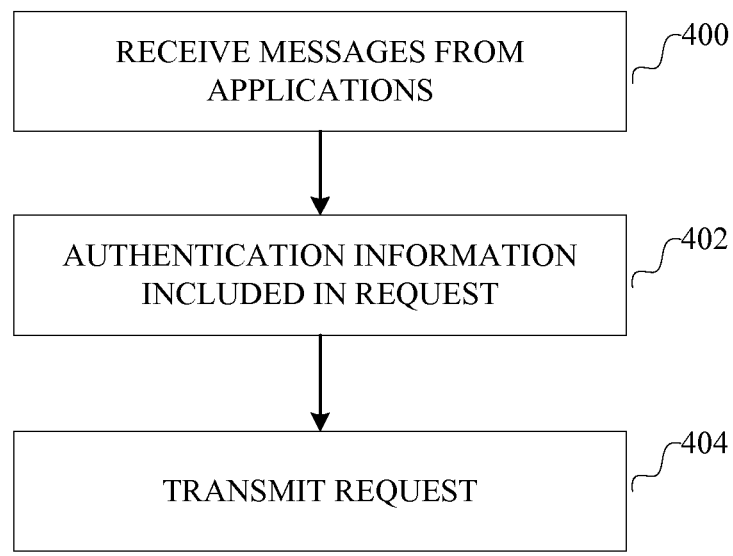
FIG. 4 is a flow chart describing how applications use such authentication credentials.

Referring now to FIG. 4, an example of how applications request access another computer network through the proxy server will now be described. The network interface module receives 400 messages, such as an HTTP request, from an application. The authentication information for the proxy server is included 402 in the request. Next the request is transmitted 404. Thus, by having the authentication information added to the settings upon connection of the network interface to the network, access through a proxy server to another computer network can be provided seamlessly and consistently across applications on the computer.

Such seamless proxy authentication is particularly useful where multiple applications running on the computer automatically connect to resources on a computer network such as the internet and/or cloud services to obtain information. For example, multiple applications with display elements that are automatically updated with information obtained from a cloud service will seamlessly be able to access such information if a proxy server is present by having the authentication information for the proxy server obtained and stored upon connection of the computer to the computer network.

Although the foregoing example implementation is described in connection with HTTP proxy servers, the invention is applicable to other kinds of proxy servers and devices that mediate communications between two computer networks, and other kinds of communication protocols over such networks.

While the foregoing describes a network interface module within an operating system, any implementation that provides for obtaining proxy server authentication information upon connection of a network interface to a network can be used. An application level process, or any other process within the computer, that monitors the network interface can be used to determine when to obtain authentication information for the proxy server.

Similarly, while the foregoing describes the proxy server authentication information as being stored in settings for a network interface, other types of storage can be used so long as requests from different applications can access and use this information.

Having now described an example implementation, an example computer, such as for implementing the various components of FIGS. 1 and 2, will now be described. The following description is intended to provide a brief, general description of a suitable computer with which this system can be implemented. The system can be implemented with numerous general purpose or special purpose computing hardware configurations. Examples of well-known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 5:
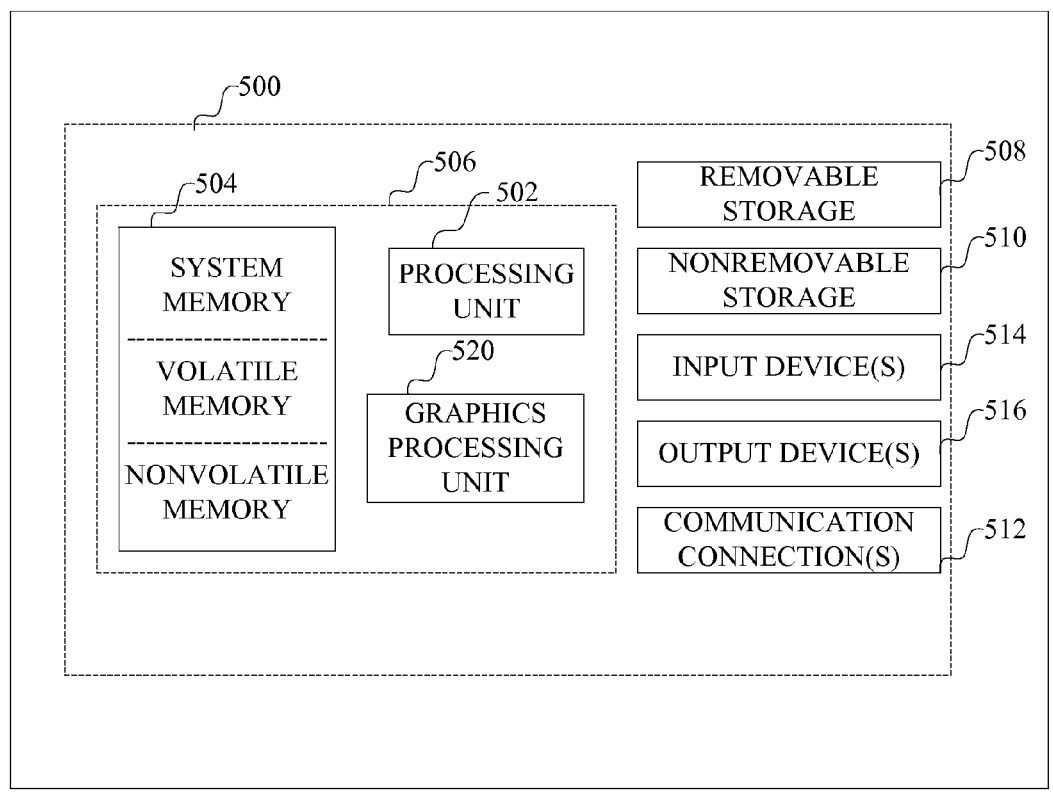
FIG. 5 is a block diagram of an example computer in which such a system can be implemented.

FIG. 5 illustrates an example of a suitable computer. This computer is only one example and is not intended to suggest any limitation as to the scope of use or functionality of this data processing system. With reference to FIG. 5, an example computer 500, in its most basic configuration, typically includes at least one processing unit 502 and memory 504. The computer may include multiple processing units and/or additional co-processing units such as graphics processing unit 520. Depending on the exact configuration and type of computer, memory 504 may be volatile (such as RAM), non-volatile (such as ROM, flash memory, etc.) or some combination of the two. This most basic configuration is illustrated in FIG. 5 by dashed line 506.

Additionally, computer 500 may also have additional features/functionality. For example, computer 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer program instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other device or article which can be used to store the desired information and which can accessed by computer 500. Any such computer storage media may be part of computer 500.

Computer 500 may also contain communications connection(s) 512 that allow the computer to communicate with other devices over a communication medium. Communication media typically carry computer program instructions, data structures, program modules or other data in a modulated data signal, such as a carrier wave or other transport mechanism, and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communication connections 512 are devices that interface with the communication media to transmit data over and receive data from communication media.

Computer 500 may have various input device(s) 514 such as a keyboard, mouse, pen, camera, touch input device, and so on. Output device(s) 516 such as a display, speakers, a printer, and so on may also be included. All of these devices are well known in the art and need not be discussed at length here. The various input and output devices can implement a natural user interface (NUI), which is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Figure 2:
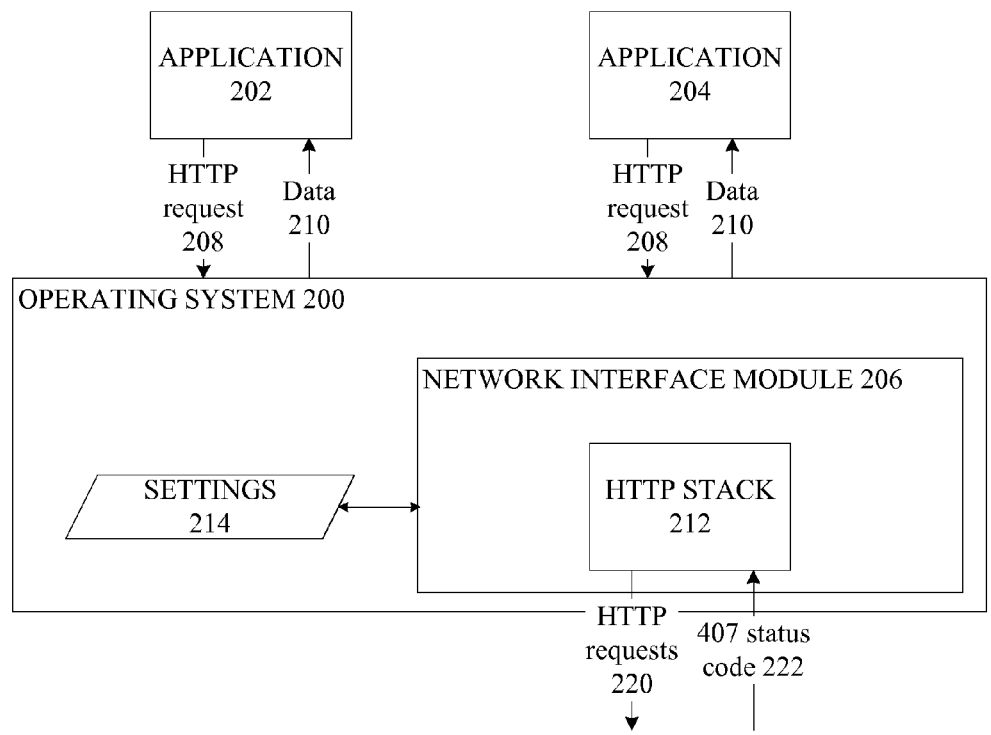
FIG. 2 is a data flow diagram illustrating an example implementation of a computer implementing seamless authentication.

The various components of the system of FIGS. 1 and 2 may be implemented using software, or, computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular data types for storing data in a storage medium. In a distributed computing environment, where tasks are performed by multiple processing devices that are linked through a communications network, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer having a network interface for connection to a computer network, the computer comprising:
   a network interface module configured, in response to connection of the network interface to a first computer network, detect whether a proxy server using authentication is connected to the first computer network, the proxy server being configured to manage access by computers on the first computer network to a second computer network;
   a user interface configured to prompt a user of the computer, in response to the network interface module detecting the proxy server using authentication, to enter authentication information for the proxy server;

storage configured to store authentication information for the proxy server in a manner accessible by applications on the computer to use the authentication information to communicate requests by the applications to access the second computer network; and the network interface module being further configured to process the requests by the applications to access the second computer network using the proxy server and being further configured to automatically include the stored authentication information from the storage with the requests.

2. The computer of claim 1, wherein the network interface module, to determine whether the proxy server uses authentication, is further configured to send a message to a computer on the second computer network and to detect an authentication error from the proxy server in reply.

3. The computer of claim 1, wherein the network interface module is configured to detect the proxy server automatically.

4. The computer of claim 1, further comprising an operating system including the network interface module.

5. The computer of claim 4, further comprising a plurality of applications, wherein the plurality of applications are configured to transmit messages to computers on the second computer network, wherein the operating system is configured to process the messages and to include the authentication information for the proxy server in the messages.

6. A computer program product, comprising:
a computer storage medium comprising at least one of a memory device and a storage device;
computer program instructions stored on the computer storage medium that, when processed by a computer, instruct the computer to perform a process comprising:
in response to connection of a network interface to a first computer network, determining, using a network interface module, whether a proxy server using authentication is connected to the first computer network, the proxy server being configured to manage access by computers on the first computer network to a second computer network;
in response to determining that a proxy server using authentication is connected to the first computer network, prompting a user of the computer to enter authentication information for the proxy server;
storing the authentication information for the proxy server in a manner accessible by applications on the computer to use the authentication information to communicate requests by the applications to access the second computer network, the network interface module being configured to process the requests by the applications to access the second computer network; and
automatically including, using the network interface module the stored authentication information with the requests.

7. The computer program product of claim 6, wherein determining comprises sending a message to a computer on the second computer network and receiving an authentication error from the proxy server in reply.

8. The computer program product of claim 6, wherein determining comprises detecting the proxy server automatically.

9. The computer program product of claim 6, wherein the computer program defines an operating system.

10. The computer program product of claim 9, wherein the operating system is configured to support a plurality of applications, wherein the plurality of applications are configured to transmit messages to computers on the second computer network, wherein the operating system is configured to process the messages and to include the authentication information for the proxy server in the messages.

11. A process for managing access by a computer to a computer network, comprising:
after connection of a network interface to a first computer network, determining, using a network interface module, whether a proxy server using authentication is connected to the first computer network, the proxy server being configured to manage access by computers on the first computer network to a second computer network;
in response to determining that a proxy server using authentication is connected to the first computer network, prompting a user of the computer to enter authentication information for the proxy server;
storing the authentication information for the proxy server in a manner accessible by applications on the computer to use the authentication information to communicate requests by the applications to access the second computer network, the network interface module being configured to process the requests by the applications to access the second computer network; and
automatically including, using the network interface module, the stored authentication information with the requests.

12. The process of claim 11, wherein determining comprises sending a message to a computer on the second computer network and receiving an authentication error from the proxy server in reply.

13. The process of claim 11, wherein determining comprises detecting the proxy server automatically.

14. The process of claim 11, wherein the determining, prompting and storing is performed by an operating system of the computer.

15. The process of claim 14, wherein the operating system is configured to support a plurality of applications, wherein the plurality of applications are configured to transmit messages to computers on the second computer network, the process further comprising:
processing, by the operating system, the messages to include the authentication information for the proxy server in the messages.

16. The process of claim 11, further comprising:
verifying the authentication information received from the user before storing the authentication information.

17. The process of claim 11, further comprising:
detecting connection to another computer network different from the first and second computer networks;
in response to detection of connection to the other computer network, detecting whether the other computer network includes a proxy server using authentication;
in response to detecting the other computer network includes a proxy server using authentication, prompting the user for authentication information for the proxy server of the other computer network.

18. The process of claim 17, further comprising:
verifying the authentication information for the proxy server of the other computer network.

19. The process of claim 18, further comprising storing the authentication information for the proxy server of the other computer network in a manner accessible by applications on the computer.

20. The process of claim 15, wherein the applications are configured to update display elements based on information obtained from a source computer on the second computer network accessed through the proxy server.

21. The computer of claim 2, further comprising an operating system including the network interface module.

22. The computer of claim 1, wherein the network interface module is further configured to verify the authentication information received from the user before storing the authentication information.

23. The computer of claim 1, wherein the network interface module is further configured to:
   detect connection of the computer to another computer network different from the first and second computer networks;
   in response to detection of connection to the other computer network, detecting whether the other computer network includes a proxy server using authentication;
   in response to a determination that the other computer network includes a proxy server using authentication, prompt the user through the user interface for authentication information for the proxy server of the other computer network.

24. The computer of claim 23, wherein the network interface module is further configured to verify the authentication information for the proxy server of the other computer network.

25. The computer of claim 24, wherein the network interface module is further configured to store the authentication information for the proxy server of the other computer network in a manner accessible by applications on the computer.

26. The computer of claim 1, wherein the applications are configured to:
   access information obtained from a computer on the second computer network accessed through the proxy server; and
   update display elements of the applications using the accessed information.

27. The computer program product of claim 7, wherein the computer program defines an operating system.

28. The computer program product of claim 7, wherein the applications are configured to:
   access information obtained from a computer on the second computer network accessed through the proxy server; and
   update display elements of the applications using the accessed information.

29. The process of claim 12, wherein the determining, prompting and storing is performed by the operating system.

30. A computer having a network interface for connection to a computer network, the computer comprising:
   one or more processing units connected to storage, the storage including computer program instructions defining an operating system, the one or more processing units being configured by execution of the operating system to:
   in response to connection of the network interface to a first computer network, send a message to another computer on a second computer network;
   in response to receipt of an authentication error from a proxy server as a reply to the message, present a user interface, the user interface being configured to prompt a user of the computer to enter authentication information for the proxy server;
   in response to input comprising authentication information, store the authentication information for the proxy server in storage in a manner accessible by applications executing by the one or more processing units on the computer to use the authentication information to communicate requests by the applications to access the second computer network; and
   in response to requests by the applications to access the second computer network through the proxy server, process the requests to automatically include the stored authentication information from the storage with the requests, and to transmit the requests with the authentication information to the second computer network through the proxy server.

31. The computer of claim 30, wherein the applications are configured to:
   access information obtained from a computer on the second computer network accessed through the proxy server; and
   update display elements of the applications using the accessed information.

32. The computer of claim 30, wherein the one or more processing units is further configured to verify the authentication information for the proxy server of the other computer network.

33. A computer having a network interface for connection to a computer network, the computer comprising:
   a network interface module configured to, in response to connection of the network interface to a first computer network, send a message to another computer on a second computer network;
   a user interface configured to prompt a user of the computer, in response to the network interface module receiving and authentication error from a proxy server, to enter authentication information for the proxy server, the proxy server being configured to manage access by computers on the first computer network to a second computer network; and
   storage configured to store the authentication information for the proxy server in a manner accessible by applications on the computer to use the authentication information to communicate requests by the applications to access the second computer network;
   the network interface module being further configured to process the requests by the applications to access the second computer network using the proxy server and being further configured to automatically include the stored authentication information from the storage with the requests.

34. The computer of claim 33, wherein the applications are configured to:
   access information obtained from a computer on the second computer network accessed through the proxy server; and
   update display elements of the applications using the accessed information.

35. The computer of claim 33, wherein the one or more processing units is further configured to verify the authentication information for the proxy server of the other computer network.

* * * * *